United States Patent
Sadhankar et al.

(10) Patent No.: US 11,935,110 B2
(45) Date of Patent: *Mar. 19, 2024

(54) METHODS AND SYSTEMS FOR ELECTRONIC COMMERCE ORDER MANAGEMENT

(71) Applicant: Shopify Inc., Ottawa (CA)

(72) Inventors: Aaron Sadhankar, Ottawa (CA); Nicholas McDonald, Ottawa (CA)

(73) Assignee: Shopify Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/742,624

(22) Filed: May 12, 2022

(65) Prior Publication Data

US 2022/0270160 A1    Aug. 25, 2022

Related U.S. Application Data

(63) Continuation of application No. 16/433,607, filed on Jun. 6, 2019, now Pat. No. 11,361,370.

(51) Int. Cl.
G06Q 30/00     (2023.01)
G06Q 20/12     (2012.01)
G06Q 30/0601   (2023.01)

(52) U.S. Cl.
CPC ......... G06Q 30/0637 (2013.01); G06Q 20/12 (2013.01)

(58) Field of Classification Search
CPC ............................ G06Q 30/0637; G06Q 20/12
USPC ..................................................... 705/26, 27
See application file for complete search history.

(56) References Cited

U.S. PATENT DOCUMENTS

| | | | |
|---|---|---|---|
| 6,876,977 B1 | 4/2005 | Marks | |
| 8,554,694 B1 | 10/2013 | Ward et al. | |
| 10,169,806 B1 | 1/2019 | Golwalkar | |
| 10,262,292 B1 | 4/2019 | Kumar et al. | |
| 10,621,564 B1 | 4/2020 | Kalaboukis | |
| 11,276,106 B2 | 3/2022 | Hwu et al. | |
| 11,361,370 B2 * | 6/2022 | Sadhankar | G06Q 20/36 |
| 2003/0065574 A1 | 4/2003 | Lawrence | |
| 2004/0019531 A1 | 1/2004 | Broussard et al. | |
| 2005/0240524 A1 | 10/2005 | Van et al. | |
| 2007/0179859 A1 | 8/2007 | Chan et al. | |
| 2009/0234875 A1 | 9/2009 | Mathai et al. | |
| 2010/0211482 A1 | 8/2010 | Nambiar et al. | |
| 2012/0203661 A1 * | 8/2012 | Baharloo | G06Q 30/0603 705/26.1 |
| 2013/0282535 A1 | 10/2013 | Bhaowal et al. | |
| 2014/0156452 A1 | 6/2014 | Lupo | |
| 2014/0279242 A1 | 9/2014 | Staicut et al. | |

(Continued)

OTHER PUBLICATIONS

U.S. Appl. No. 16/433,607, "U.S. Appl. No. 16/433,607, Advisory Action dated Jul. 12, 2021", Aaron Sadhankar, 7 pages.

(Continued)

*Primary Examiner* — Robert M Pond
(74) *Attorney, Agent, or Firm* — Rowand LLP

(57) ABSTRACT

A computer-implemented method and system may include receiving, at an e-commerce order processor, an order comprising at least one product, wherein the order is received in conjunction with an order completion event; receiving an order completion criterion; receiving an order change; and processing an order completion based on the order completion criterion.

20 Claims, 5 Drawing Sheets

(56) References Cited

U.S. PATENT DOCUMENTS

| | | |
|---|---|---|
| 2015/0025991 A1 | 1/2015 | Shaw |
| 2015/0193858 A1 | 7/2015 | Reed et al. |
| 2015/0235299 A1 | 8/2015 | Dhillon et al. |
| 2016/0035005 A1 | 2/2016 | Kumar et al. |
| 2016/0171578 A1 | 6/2016 | Bawge et al. |
| 2017/0161672 A1 | 6/2017 | Crotty |
| 2020/0184543 A1 | 6/2020 | Hwu et al. |
| 2020/0387945 A1 | 12/2020 | Sadhankar et al. |
| 2020/0387954 A1 | 12/2020 | Sadhankar et al. |

OTHER PUBLICATIONS

U.S. Appl. No. 16/433,607, "U.S. Appl. No. 16/433,607, Final Office Action dated Apr. 23, 2021", Aaron Sadhankar, 38 pages.

U.S. Appl. No. 16/433,607, "U.S. Appl. No. 16/433,607, Non-Final Office Action dated Sep. 15, 2021", Aaron Sadhankar, 20 pages.

U.S. Appl. No. 16/433,607, "U.S. Appl. No. 16/433,607, Non-Final Office Action dated Oct. 28, 2020", Aaron Sadhankar, 24 pages.

U.S. Appl. No. 16/433,607, "U.S. Appl. No. 16/433,607, Notice of Allowance mailed Apr. 4, 2022", Aaron Sadhankar, 8 pages.

U.S. Appl. No. 16/433,635, "U.S. Appl. No. 16/433,635, Final Office Action dated Jan. 4, 2022", Aaron Sadhankar, 22 pages.

U.S. Appl. No. 16/433,635, "U.S. Appl. No. 16/433,635, Non-Final Office Action dated May 9, 2022", Aaron Sadhankar, 20 bages.

U.S. Appl. No. 16/433,635, "U.S. Appl. No. 16/433,635, Non-Final Office Action dated Jun. 24, 2021", Aaron Sadhankar, 23 bages.

Fred, Jon, "Typical Cloud ERP Vs. Manufacturing Cloud ERP", Food Manufacturing: n/a. Advantage Business Media, Dialog #1756232553, Dec. 2, 2015, 5 pages.

Garrehy, Pat, "Purchase Order Management Must Go Beyond Tracking Orders", Food Manufacturing: Advantage Business Media, Dialog #1611889237, Jul. 15, 2014, 3 pages.

* cited by examiner

METHODS AND SYSTEMS FOR ELECTRONIC COMMERCE ORDER MANAGEMENT

CROSS-REFERENCE TO RELATED APPLICATION(S)

This application is a continuation of and claims priority to U.S. patent Ser. No. 16/433,607 (SHOP-0031-U01), filed Jun. 6, 2019, and entitled "METHODS AND SYSTEMS FOR ELECTRONIC COMMERCE ORDER MANAGEMENT". The content of the foregoing application is hereby incorporated by reference in its entirety for all purposes.

FIELD

The present disclosure relates generally to order management, and more specifically to order management preferences in electronic commerce.

BACKGROUND

Online commerce conventionally involves the selection of products, placing the products in a shopping cart, inserting payment details, and completing the transaction. It is often difficult to deal with an inaccurate order after the order has been completed leading possibly to order cancellations, returns, and the like. This is particularly true for complex or expensive orders or orders that involve multiple users. There is a need in art for methods and systems to provide greater flexibility in order management and for example, reduce the possibility of cancellations or returns.

SUMMARY

In an aspect, a computer-implemented method may include receiving, at an e-commerce order processor, an order comprising at least one product, wherein the order is received in conjunction with an order completion event; receiving an order completion criterion; receiving an order change; and processing an order completion based on the order completion criterion. In embodiments, an order deferment may be included for the order based on an order completion criterion. The processing of the order deferment may be pre-processed with respect to receiving the order. The order completion event may include a payment submission and payment processing of the payment submission may be made after processing the order completion. The order completion event may include a payment authorization and payment processing of the payment authorization may be made after processing the order completion. The order completion event may include a payment offer and fulfillment of the payment offer may be made after processing the order completion. The order completion may be processed in the absence of receiving an order change after a predetermined period of time. The order completion criterion may be stored as an order preference. The order completion criterion may be a monetary purchase value threshold for the order. The order completion criterion may be a time period delay between the received order and the processing of the order completion. The order completion criterion may be a quantity threshold for the at least one product. The order completion criterion may be a quantity threshold for products comprising the order. The order completion criterion may be a number of changes made to the order. The order deferment may be a delay in a payment processing and fulfillment of the order. The order deferment may be a delay in an invoicing and fulfillment of the order. The order change may be at least one of adding a product to the order, deleting a product from the order, or changing a quantity for a product in the order. The order may be a new product order and may be for at least one new product and processing the order completion comprises an order fulfillment process. The order may be an exchange order for exchanging a first product for a second product and processing the order completion may include an exchange of product process. The order may be a return order for returning a product and processing the order completion may include a product return process. The product may be a service to be provided. The e-commerce order processor may provide a user interface for composing the order, presenting the order completion event, and providing the order completion criterion.

In an aspect, a system may include an e-commerce order processor configured to store a set of instructions that, when executed, cause the e-commerce order processor to: receive, at an e-commerce order processor, an order comprising at least one product, wherein the order is received in conjunction with an order completion event; receive an order completion criterion; receive an order change; and process an order completion based on the order completion criterion. In embodiments, an order deferment may be included for the order based on an order completion criterion. The processing of the order deferment may be pre-processed with respect to receiving the order. The order completion event may include a payment submission and payment processing of the payment submission may be made after processing the order completion. The order completion event may include a payment authorization and payment processing of the payment authorization may be made after processing the order completion. The order completion event may include a payment offer and fulfillment of the payment offer may be made after processing the order completion. The order completion may be processed in the absence of receiving an order change after a predetermined period of time. The order completion criterion may be stored as an order preference. The order completion criterion may be a monetary purchase value threshold for the order. The order completion criterion may be a time period delay between the received order and the processing of the order completion. The order completion criterion may be a quantity threshold for the at least one product. The order completion criterion may be a quantity threshold for products comprising the order. The order completion criterion may be a number of changes made to the order. The order deferment may be a delay in a payment processing and fulfillment of the order. The order deferment may be a delay in an invoicing and fulfillment of the order. The order change may be at least one of adding a product to the order, deleting a product from the order, or changing a quantity for a product in the order. The order may be a new product order and may be for at least one new product and processing the order completion comprises an order fulfillment process. The order may be an exchange order for exchanging a first product for a second product and processing the order completion may include an exchange of product process. The order may be a return order for returning a product and processing the order completion may include a product return process. The product may be a service to be provided. The e-commerce order processor may provide a user interface for composing the order, presenting the order completion event, and providing the order completion criterion.

In an aspect, a computer-implemented method may include receiving, at an e-commerce order processor, an order from a first user comprising at least one product, wherein the order is received in association with an order sharing configuration indication; processing the order based on an order sharing criterion; receiving an order change from a second user; and processing an order completion. In embodiments, the order sharing configuration indication may indicate that order privileges for the order are shared with at least the second user based on an order sharing configuration. The order sharing configuration may include sharing privileges associated with adding products, deleting products, or changing a quantity of products in the order. The order sharing configuration may include sharing privileges including a maximum monetary value for products added to the order. The order sharing configuration may include sharing privileges including a maximum quantity value for products added to the order. The order sharing configuration may include sharing privileges including a limit associated with a brand name associated with a product added to the order. The order sharing configuration may be received with the order from the first user. The order sharing configuration indication may indicate that changes to the order are permitted from the second user prior to processing the order completion based on the order sharing criterion. The order sharing criterion may limit the second user to a monetary purchase value threshold for the order and processing the order completion when the monetary purchase value threshold is met. The order sharing criterion may limit the second user to a time period delay between the received order and the processing of the order completion. The order sharing criterion may limit the second user to a quantity threshold for the at least one product. The order sharing criterion may limit the second user to a quantity threshold for total products comprising the order. The order change may be at least one of adding a product to the order, deleting a product from the order, or changing a quantity for a product in the order. The order may be a new product order and may be for at least one new product and processing the order completion comprises an order fulfillment process. The order may be an exchange order for exchanging a first product for a second product and processing the order completion may include an exchange of product process. The order may be a return order for returning a product and processing the order completion may include a product return process. The product may be a service to be provided. The e-commerce order processor may provide a user interface for receiving the order and the order sharing criterion.

In an aspect, a system may include an e-commerce order processor configured to store a set of instructions that, when executed, cause the e-commerce order processor to: receive, at an e-commerce order processor, an order from a first user comprising at least one product, wherein the order is received in conjunction with an order sharing configuration indication; process the order based on an order sharing criterion; receive an order change from a second user; and process an order completion. In embodiments, the order sharing configuration indication may indicate that order privileges for the order are shared with at least the second user based on an order sharing configuration. The order sharing configuration may include sharing privileges associated with adding products, deleting products, or changing a quantity of products in the order. The order sharing configuration may include sharing privileges including a maximum monetary value for products added to the order. The order sharing configuration may include sharing privileges including a maximum quantity value for products added to the order. The order sharing configuration may include sharing privileges including a limit associated with a brand name associated with a product added to the order.

The order sharing configuration may be received with the order from the first user. The order sharing configuration indication may indicate that changes to the order are permitted from the second user prior to processing the order completion based on the order sharing criterion. The order sharing criterion may limit the second user to a monetary purchase value threshold for the order and processing the order completion when the monetary purchase value threshold is met. The order sharing criterion may limit the second user to a time period delay between the received order and the processing of the order completion. The order sharing criterion may limit the second user to a quantity threshold for the at least one product. The order sharing criterion may limit the second user to a quantity threshold for total products comprising the order. The order change may be at least one of adding a product to the order, deleting a product from the order, or changing a quantity for a product in the order. The order may be a new product order and may be for at least one new product and processing the order completion comprises an order fulfillment process. The order may be an exchange order for exchanging a first product for a second product and processing the order completion may include an exchange of product process. The order may be a return order for returning a product and processing the order completion may include a product return process. The product may be a service to be provided. The e-commerce order processor may provide a user interface for receiving the order and the order sharing criterion.

In an aspect, a computer-implemented method may include receiving, at an e-commerce order processor, an order from a first user comprising at least one product, wherein the order is received in conjunction with an order sharing configuration indication and in conjunction with an order completion event; processing an order deferment for the order based on an order sharing criterion; receiving an order change from a second user; and processing an order completion based on the order sharing criterion. In embodiments, the order sharing configuration indication may indicate that order privileges for the order are shared with at least the second user based on an order sharing configuration. The order sharing configuration may include sharing privileges associated with adding, deleting, or changing quantities of products comprising the order. The order sharing configuration may include sharing privileges comprising a maximum monetary value for adding products to the order. The order sharing configuration may include sharing privileges comprising a maximum quantity value for products added to the order. The order sharing configuration may include sharing privileges comprising a limit associated with a brand name associated with a product added to the order. The order sharing configuration may be received with the order from the first user. The order sharing configuration may include a data structure for the shared order amongst a plurality of users sharing order privileges. Order privileges for each of the plurality of users may be stored in separate data structures. Access to the separate data structures may be provided through an access code. The data structure may include tracking of order contributions for each of the plurality of users. The data structure may include tracking of order contributions associated with different product merchants. The order sharing configuration indication may indicate that changes to the order are permitted from the second user prior to processing the order completion based on the order sharing criterion. The order sharing criterion may limit the second user to a monetary purchase value threshold for the order and processing the order completion when the monetary purchase value threshold is met. The order sharing criterion may limit the second user to a time period delay between the received order and the processing of the order completion. The order sharing criterion may limit the second user to a quantity threshold for the at least one product. The order sharing criterion may limit the second user to a quantity threshold for total products comprising the order. The order deferment may be a delay in a payment processing and fulfillment of the order until the order change is received from the second user. The order deferment may be a delay in an invoicing and fulfillment of the order until the order change is received from the second user. The order deferment may be a delay in a payment processing until an order completion criterion is met. The order completion criterion may be a monetary purchase value threshold for the order. The order completion criterion may be a time period delay between the received order and the processing of the order completion. The order completion criterion may be a quantity threshold for the at least one product. The order completion criterion may be a quantity threshold for products comprising the order. The order change may be at least one of adding a product to the order, deleting a product from the order, or changing a quantity for a product in the order. The order may be a new product order that is for at least one new product and processing the order completion comprises an order fulfillment process. The order may be an exchange order for exchanging a first product for a second product and processing the order completion comprises an exchange of product process. The order may be a return order for returning a product and processing the order completion comprises a product return process. The product may be a service to be provided. The e-commerce order processor may provide a user interface for composing the order, presenting the order completion event, and providing the order sharing criterion.

In an aspect, a system may include an e-commerce order processor configured to store a set of instructions that, when executed, cause the e-commerce order processor to: receive, at an e-commerce order processor, an order from a first user comprising at least one product, wherein the order is received in conjunction with an order sharing configuration indication and in conjunction with an order completion event; process an order deferment for the order based on an order sharing criterion; receive an order change from a second user; and process an order completion based on the order sharing criterion. In embodiments, the order sharing configuration indication may indicate that order privileges for the order are shared with at least the second user based on an order sharing configuration. The order sharing configuration may include sharing privileges associated with adding, deleting, or changing quantities of products comprising the order. The order sharing configuration may include sharing privileges comprising a maximum monetary value for adding products to the order. The order sharing configuration may include sharing privileges comprising a maximum quantity value for products added to the order. The order sharing configuration may include sharing privileges comprising a limit associated with a brand name associated with a product added to the order. The order sharing configuration may be received with the order from the first user. The order sharing configuration may include a data structure for the shared order amongst a plurality of users sharing order privileges. Order privileges for each of the plurality of users may be stored in separate data structures. Access to the separate data structures may be provided through an access code. The data structure may include tracking of order contributions for each of the plurality of users. The data structure may include tracking of order contributions associated with different product merchants. The order sharing configuration indication may indicate that changes to the order are permitted from the second user prior to processing the order completion based on the order sharing criterion. The order sharing criterion may limit the second user to a monetary purchase value threshold for the order and processing the order completion when the monetary purchase value threshold is met. The order sharing criterion may limit the second user to a time period delay between the received order and the processing of the order completion. The order sharing criterion may limit the second user to a quantity threshold for the at least one product. The order sharing criterion may limit the second user to a quantity threshold for total products comprising the order. The order deferment may be a delay in a payment processing and fulfillment of the order until the order change is received from the second user. The order deferment may be a delay in an invoicing and fulfillment of the order until the order change is received from the second user. The order deferment may be a delay in a payment processing until an order completion criterion is met. The order completion criterion may be a monetary purchase value threshold for the order. The order completion criterion may be a time period delay between the received order and the processing of the order completion. The order completion criterion may be a quantity threshold for the at least one product. The order completion criterion may be a quantity threshold for products comprising the order. The order change may be at least one of adding a product to the order, deleting a product from the order, or changing a quantity for a product in the order. The order may be a new product order that is for at least one new product and processing the order completion comprises an order fulfillment process. The order may be an exchange order for exchanging a first product for a second product and processing the order completion comprises an exchange of product process. The order may be a return order for returning a product and processing the order completion comprises a product return process. The product may be a service to be provided. The e-commerce order processor may provide a user interface for composing the order, presenting the order completion event, and providing the order sharing criterion.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

Figure 1:
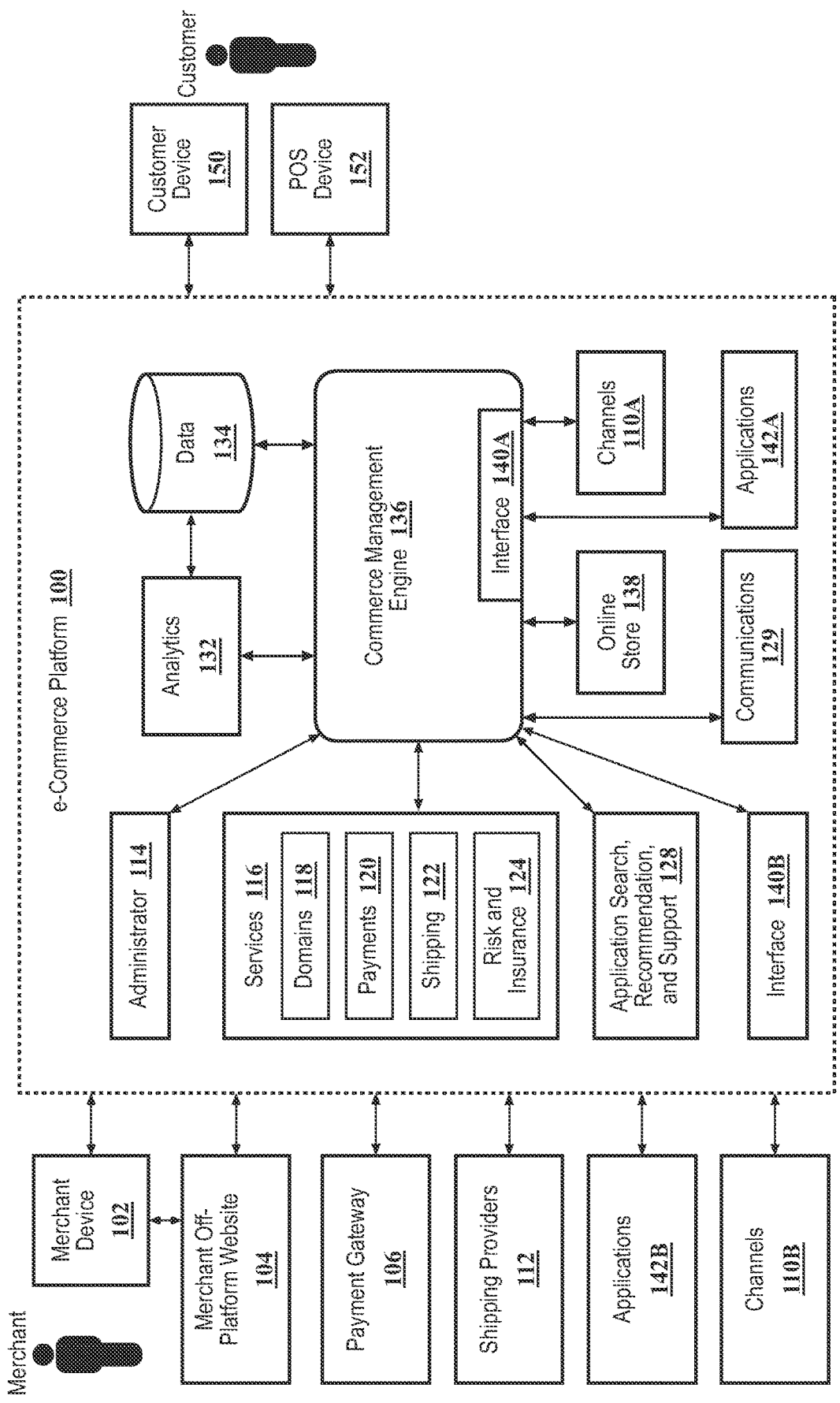
FIG. 1 depicts an embodiment of an e-commerce platform.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
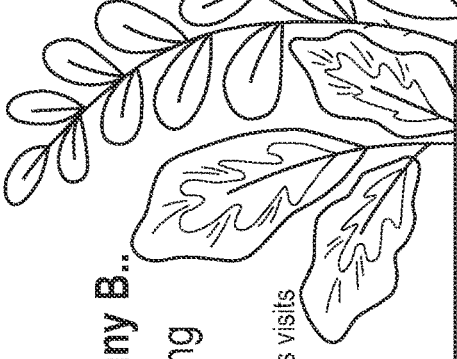
FIG. 2 depicts an embodiment for a home page of an administrator.

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

In embodiments, the e-commerce platform 100 may provide customers, or more generally users, with the ability to make orders for products and services through online stores 138, such as through a customer device 150 and in conjunction with e-commerce services 116, payment gateway 106, shipping providers 112, and the like. In embodiments, a user may place an order, make payment, and receive the order through shipping. In embodiments, an order may be placed offline, such as in a physical retail location or by telephone and products and services may be received without shipping.

In online commerce, once an order is paid for or completed it is difficult to alter aspects of the ordering process, such as making further changes to the order, collaborating on the order, sharing the order, changing the order configuration, and the like. For instance, online commerce orders are tied to a particular buyer and it is not possible to have multiple users collaborate in respect of an order without sharing access credentials across users which often results in sharing sensitive information, such as payment information. Further, orders that are draft orders (e.g., items in a shopping cart but without a payment commitment) may be changed at will, but orders after a payment commitment are not able to be left open to change. As such, there is a need to assist in allowing orders to be revised once a payment commitment has been made or the order has been completed and to allow collaboration across multiple users in respect of an order.

In embodiments, the e-commerce platform 100 may provide for an order that is a dynamic order for requesting products to be supplied, where a dynamic order enables a user to place an order while maintaining the ability to edit the order within a set of order completion criteria, such as set by the user. A dynamic order (hereafter referred to simply as an order) may involve the purchase, payment or authorization for payment for a product (e.g., to reserve or guarantee supply of a product), with the order remaining open to edits to allow for changes to the order, such as changes to existing products included in the order and/or adding new products. An order may be a running order for which a purchase or payment has not yet been made, a list of products (e.g., as listed in a shopping cart) before a purchase or order is formalized, for products from a single merchant or across multiple merchants (e.g., with merchant permission), and the like. For instance, an order may be where payment has been made or authorized, but where the order remains open and can be changed, such as before the order is closed. In this way a payment may be processed but where the order is left editable, creating an open order state of the order status enabling the user to edit the order after a payment has been processed and allowing for a secondary payment or refund event in case the edit has a different cost associated with the change (e.g., secondary payment if the cost has increased as a result of edits or a refund if the cost has decreased as the result of edits). In embodiments, multiple subsequent payment or refund events may be processed during the open order, such as when multiple edits to the open order are made that increase or decrease the cost of the order (e.g., an initial payment followed by an edit that increases cost resulting in a secondary payment, followed by a new edit that decreases cost resulting in a refund, and so on). For the purposes of this disclosure, an 'open' order is an order for which a user has provided a payment commitment for the products in the order (e.g., a user has submitted payment for the order or payment has been authorized), an 'order completion criterion' is a condition for deferring the completion of the order (e.g., the user wants to delay shipment of the order to give the user (and/or others through a shared order) an opportunity to change the order after the payment commitment), and a 'closed' order is an order that may not be further changed such as when the order completion criterion has been met (e.g., after a specified period of time after the order was opened a final invoice is generated and the product is shipped). Although embodiments described herein may apply to a 'draft' order, such as where a shopper is filling a shopping cart with no commitment to paying, an open order as described herein may require some form of financial commitment. For instance, a user may first place products in a shopping cart before committing to payment (e.g., maintaining a draft order), and then make a payment commitment in association with at least one order completion criterion (e.g., making the order an 'open' order in association an order completion criterion), where the order closes once the order completion criterion is met (e.g., a user specifies a time delay after payment commitment where once the delay is over the order closes and a final invoice is generated and the product ships). In embodiments, an order completion criterion may be set by the user, by other authorized users, and the like. Further, the e-commerce platform may set an order completion criterion, such as where the e-commerce platform 100 learns the preferences for a user (or users) over time, such as through machine learning. For example, the e-commerce platform 100 may learn that a user always makes changes and was denied a change because the order was already closed, so the e-commerce platform 100 sets an order completion criterion to allow more changes (e.g., without explicit instructions from the user, but learned through machine learning).

In embodiments, a user (e.g., a buyer) may specify preferences or configure settings in respect of an order, such as regarding keeping an order open, allowing changes to be made to an order (e.g., including after payment has been made on an order) and sharing of an order with other users. An order as such is different from a traditional shopping cart purchase model, where an order as described herein may enable a user (or group of users) to continue changing the order (e.g., saving, editing, and/or sharing the order) even after a purchase commitment has been made (e.g., where payment has been made or authorized), and where a secondary payment(s) or refund(s) are permitted if the edits change the costs from the initial payment. Further, the user may be allowed to set order preferences with settings to control certain parameters of an order (e.g. a completed or authorized transaction in relation to at least one product) in a way that allows different types of edits by the user before the order (or parts thereof) is actually fulfilled and/or shipped. In embodiments, order preferences may be applied to one order, to many orders, set as default for all orders, and the like. For example, order preferences may include a completion criterion for a time period after the start of an order to the close of the order (e.g., close order 5 days after the start of the order), for when after the start of an order to make final payment (e.g., the order is started with an order of at least one product along with a purchase authorization, but where the actual transaction is not completed (e.g. payment authorized or completed for the product) or final purchase receipt is not generated until the order includes 'X' number of order items), when after the start of an order before products are shipped (e.g., purchased products are not shipped until the total cost of the order has reached a purchase threshold), and the like. The completion criterion may be based on time (e.g., hours, days, or weeks), number of changes to the order (e.g., number of additions to the order), total cost amounts (e.g., total cost amount associated with changes to the order, total cost of the order, or cost of a sub-group of the order), and the like. The completion criterion may be a financial limit set for an order, such as an upper or lower dollar amount for an order or for a particular product or type or category of product(s). In this way, order preferences may function to set a budget for the order. In embodiments, a user may set cost limits through order preferences for orders categorized by time (e.g., all orders made in a given month), products (e.g., order items related to office supplies), users (e.g., for a particular employee of a company through which the order is being placed), and the like. In embodiments, order preferences may be shared, such as with which other users to the share the order with and what each user may be able to do in respect of the order.

In embodiments, changes to an order may include different types of edits, such as adding or removing products and/or product variants, changing the number of products or quantities of a given product in the order, changing or adding customization features associated with a product, adding/removing recipients or buyers (e.g., changing payments or shipping destinations), and the like. Benefits associated with providing users with the ability to control changes to an order may include extending a fulfillment timeline for an order (e.g., providing 'X' number of days after an order has been placed in which the user can change the order without affecting shipping (and need for returns)), pushing out the shipping date artificially (e.g., deferring shipping as a preference), setting a maximum or minimum order amount to allow for expected changes (e.g., placing an order for $800 but allowing the order to be changed to a maximum of $1000), making customizations to products ordered by the user or other authorized order editors (e.g., placing an order along with a payment but allowing for a period of time in which a second user can customize the order, products in the order, or groups of products in the order), and the like.

Figure 3:
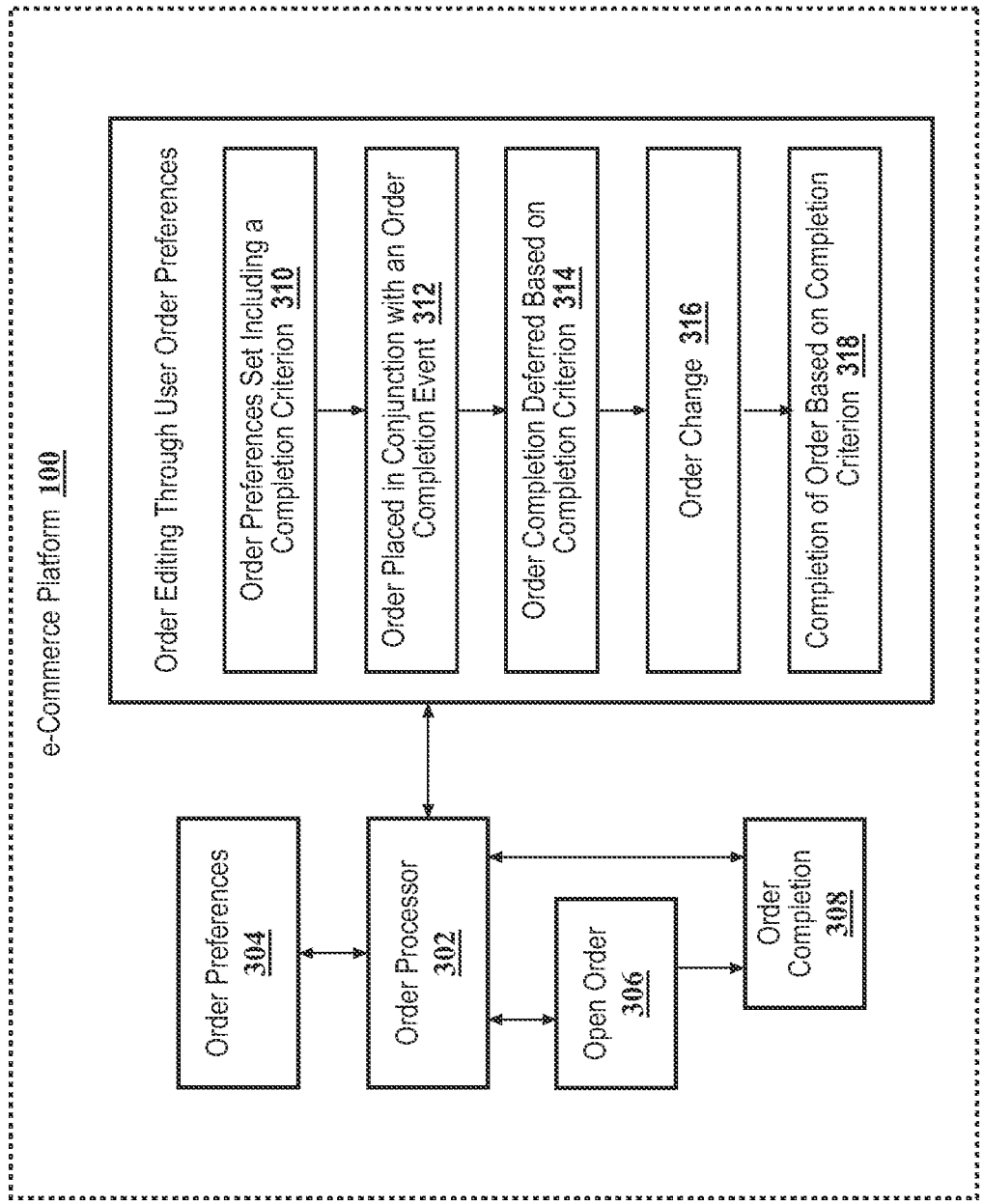
FIG. 3 depicts an embodiment functional block diagram for an e-commerce platform with order preference functionality.

Referring to FIG. 3, the e-commerce platform 100 may provide for an order processor 302 that receives an order in conjunction with an order completion event (e.g., an order payment, authorization for payment, payment offer for fulfillment, and the like), where as a result the order is kept as an open order 306 allowing a user to make changes to the order until an order completion 308 (e.g., when the order is invoiced, fulfilled, packed, shipped, and the like). Keeping the order open may be provided through an order completion criterion stored in order preferences 304, where an order completion criterion may be a condition or set of conditions that a user specifies in order preferences 304 to keep the order open even after an order completion event. For example, a user may place an order and make payment (e.g., the order completion event), but if the user has set an order completion criterion that specifies the order should be kept open (e.g., not fulfilled, invoiced, shipped, and the like) until three days after the order was initially placed, the user will maintain the ability to change the order over those intervening days (e.g., even though payment has been received for the initial order).

An order completion criterion may be time based (e.g., a time period delay between the received order and the processing of the order completion), cost based (e.g., monetary purchase value threshold for the order), quantity based (e.g., quantity threshold for at least one product or a quantity threshold for products comprising the total order), change based (e.g., number of changes made to the order), and the like. Based on the order completion criterion, the order processor 302 may process an order deferment for the order, where an order deferment may be a delay in a payment processing and fulfillment of the order, a delay in an invoicing and fulfillment of the order, a delay in shipping the order, and the like. In embodiments, the processing of the order deferment may be pre-processed with respect to the time for receiving the order. During the order deferment a user (or users) may make changes to the order, such as adding a product to the order, deleting a product from the order, changing a quantity for a product in the order, and the like. The order processor 302 may then process an order completion based on the order completion criterion. In embodiments, an order completion may be processed in the absence of receiving an order change, such as after a predetermined period of time. In embodiments, the order may be a purchase of a new product, an exchange order for exchanging a first product for a second product, a return order for returning a product, and the like.

In a non-limiting embodiment process flow, in a first step 310 an order preference may be set including a completion criterion (which may be pre-processed and stored prior to the receiving of an order or received at the time of the order); in a second step 312 an order may be placed in conjunction with an order completion event; in a third step 314 an order completion may be deferred based on the completion criterion; in a fourth step 316 an order change may be received;

and in a fifth step 318 completion of order may be made based on the completion criterion.

In embodiments, order privileges and functionality may be shared between multiple users (e.g., buyer, customer, merchant, merchant staff, employees of a company, friends, family, club members, and the like), such as through a shared access and collaborative settings associated with an order, where sharing access may be provided by one or more of the users (e.g., one or more users have control of who gets shared access to an order, and what permissions each user is granted). Permissions and conditional access may be provided to a user, group of users, category or type of user, and the like. Access to an order may be provided to certain aspects of an order or allow shared users to make certain kinds of changes. For example, shared access may not allow a certain user to see or change payment information, such as payment card information, but another user may be in a manager category and have permission to view and change payment card information.

In embodiments, collaborative settings may be associated with whether users with shared order access are able to process, add, delete, and the like, products of certain types (e.g., within product classifications of products already on the order), prohibited products or types of products (e.g., controlled goods such as alcohol or firearms), products of certain sources or brands (e.g., products from a particular merchant), and the like. Collaborative settings may determine certain products cannot be removed from an order (or other aspects of an order that cannot be changed by others), limit dollar amounts for products, specify types of products or overall category for order, limit the quantity of products (e.g., a limit on the total number of products overall or on the total number of products of a certain type), and the like. Collaborative settings may have a combination of settings and factors that apply together (e.g., a user restricted to adding only shoes in an order and if purchased from merchant 'A' then must be of brand 'X' and up to two pairs, and if purchased from merchant 'B' then can be any brand and up to one pair).

Shared order privileges may enable many users to collaborate on an order and place the order together. As such, a purchase situation where, from a merchant's perspective it is a single order, is from a user's/buyer's perspective actually multiple individuals involved. For instance, a business may authorize specific employees to be able to work on a large order, parents may buy things for their children where the children may want to modify/add to the purchase, a group/party of people buying something from a service provider (e.g., entertainment, lodging, transportation and the like, especially if there is a mix of services and products), an interior designer working with clients to purchase furniture, and the like. In general, shared order privileges may benefit a situation where an order can be open-ended with the possibility of multiple people being involved.

Figure 4:
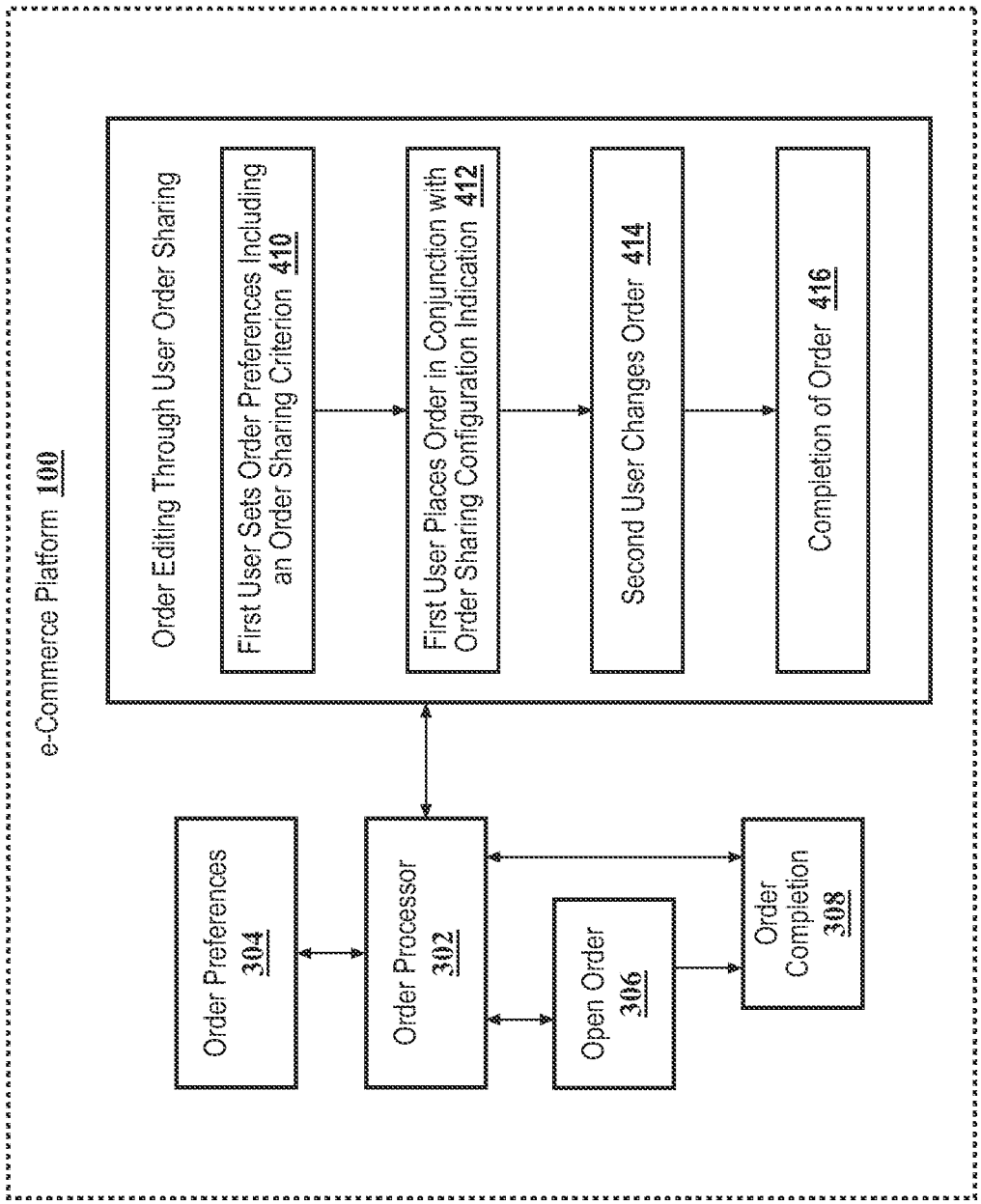
FIG. 4 depicts an embodiment functional block diagram for an e-commerce platform with order sharing functionality.

Referring to FIG. 4, the e-commerce platform 100 may provide for an order processor 302 that receives an order from a first user, where the order is received in conjunction with an indication that the order is to be processed with respect to an order sharing configuration (e.g., order sharing privileges associated with the different users), such as between the first user and at least a second user. The order sharing configuration may be stored as a part of order preferences 304, pre-processed before the order is received, received at the time of the order, and the like. The order may then be kept as an open order 306, such as to allow for the different users to change the order (e.g., adding, editing, deleting aspects of the order), before order completion. In embodiments, the order may be kept open based on a user direction or based on a stored order preference. Alternately, in embodiments, the order may be received in conjunction with an order completion event, where an order deferment may be determined by preferences stored in order preferences (e.g., as part of order sharing criterion, order completion criterion, and the like).

In embodiments, an order sharing configuration may include sharing privileges such as a maximum monetary value for adding products to the order, a maximum quantity value for products added to the order, a limit associated with a brand name associated with a product added to the order, and the like. The order sharing configuration may be received with the order from the first user or may be set more generally. The order sharing configuration may indicate that changes to the order are permitted from a second user prior to processing the order completion based on the order sharing criterion.

In embodiments, an order sharing criterion may limit a user to a monetary purchase value threshold for the order and processing the order completion when the monetary purchase value threshold is met, limit a user to a time period delay between the received order and the processing of the order completion, limit a user to a quantity threshold for a product, limit a user to a quantity threshold for total products comprising the order, where a user may change the order within the constraints determined through the order sharing criterion, such as where the order change is adding a product to the order, deleting a product from the order, changing a quantity for a product in the order, and the like. In embodiments, order sharing may be applied to a new order, an exchange order, a returning order, and the like. In embodiments, the order sharing criterion may be used instead of or in combination with the order sharing configuration. In embodiments, the order sharing criterion and/or order sharing configuration may include a configuration setting to process the order completion if no order changes have been detected for a (configurable) period of time.

In a non-limiting embodiment process flow, in a first step 410 a first user may set order preferences including an order sharing criterion, in a second step 412 the first user may place an order in conjunction with an order sharing configuration indication. In embodiments, the second step 412 may precede the first step 410. In a third step 414 the second user may change the order, and in a fifth step 416 the order may be completed (e.g. when order changes have been detected or after a period of time if no changes have been detected).

In embodiments, shared order information for multiple users of a shared order may be stored in a shared data structure, such as to store or provide pointers to permissions granted to each of the multiple users (e.g., each user associated with an account or user ID). In embodiments, the shared data structure may enable the tracking of order items in the order with an audit log for each order item (e.g., for tracking which user ordered or changed (including when) different order items). For instance, the shared data structure for a user may keep track of what items the user ordered, from what merchants, in what quantities, and the like. For this information analytics may be used to determine how a user places orders, such as with regard to timing of the order, timing of changes to the order, pricing of order items relative to order criterion, and the like. In embodiments, the shared data structure may have a hierarchical structure that maintains shared user data based on orders, merchants, products, and the like. For instance, the shared data structure may enable tracking order data across multiple merchants for an order, across orders, with respect to individual users, and the like. In embodiments, in such hierarchical structure for tracking across merchants the order entity may be higher than the merchant entity.

In an example embodiment, a user may be a personal or virtual shopper (also referred to as a personal virtual shopper herein), who has a business shopping on behalf of someone else (e.g., a person who outsources shopping or certain aspects of shopping to the personal virtual shopper). As a business model, the personal virtual shopper may need to optimize orders across a group of clients, where the personal virtual shopper may be buying for many different clients on a single order, so there is a need to have order preferences that allows them to do that. For instance, the personal virtual shopper may keep an order open when buying many T-shirts across several different clients, so there is an advantage to not closing the order until the need for all clients is met. Further, the personal virtual shopper may want to work with a client on an order, such as sharing with the client what has been ordered or sharing order privileges with the client on the order. In this instance, the personal virtual shopper may start the order and then share privileges with the client so that the personal virtual shopper and the client may collaborate on the order. In another instance, the client may start the order and then (e.g., realizing there is not enough time to complete the shopping) shares the order with the personal virtual shopper, where again, the personal virtual shopper and the client may then collaborate on the order, such as where the personal virtual shopper is able to change the order within pre-set limits (via order preferences), but may not be able to view payment card details or complete the order.

In an example embodiment, a user may be an employee of a business ordering supplies, parts, components, inventory, and the like. In this instance, an owner (or manager or senior member) of a business may start an order (e.g., make an initial payment commitment) and then share the order with certain staff. The staff may then fine tune the order, such as changing products within product categories and quantities of the order within set limits determined in order preferences (e.g., the staff do not see the credit card/payment information, can only add certain types of products or make certain changes). In in the instance where the costs change from the initial payment commitment, a subsequent payment(s) or refund(s) may be made that adjusts the cost of the order.

In an example embodiment, a group of users (e.g., friends, family or social group) may collaborate on the order and place the order together. For example, to obtain a volume discount, the group of users may set order preferences so that the order does not close unless the order reaches a threshold needed in terms of volume. The group of users may then set payment options to split the final costs amongst them. Further, a discount may be applied retroactively based on the volume level obtained, even after payment is made (e.g., as a refund).

In an example embodiment, a group of users may be a wedding party sharing the responsibilities of ordering supplies for a reception. The wedding party may be working alone or in conjunction with a professional wedding planner, but in both instances there may be benefits to controlling ordering privileges amongst the wedding party members (e.g., some members have financial control of payment methods, some are only ordering, groups within the wedding party may need to be controlled based on cost and volumes, and the like) and/or sharing the ordering amongst them (e.g., all members get to view the order, some members get to view the entire order and others only viewing categories, some have viewing privileges and some viewing and ordering privileges, and the like).

In an example embodiment, a group of users may be members in a family, such as where parents are ordering clothes, school supplies, food, and the like, and sharing the order with their children (and personal shopper(s), housekeepers, and the like). In this instance, control of ordering privileges for the children may exclude payment control, limit quantities and types of products, limit costs of products, place limits or preferences on brand names, and the like, while the adults have greater control. An order may be set to close at the end of the week for weekly food shopping, at the end of the summer for back-to-school items, a certain number of days prior to an event based on shipping time requirements, and the like. Benefits for utilizing order preferences may not only enable control of an order, but also may have the advantage that placing an order and making say an initial payment (e.g., at the start of the order, at each change of the order) may enable locking in the availability for a product. For instance, during back-to-school shopping the children may have anxiety about items going out of stock as the summer ends while their parents are not yet ready to close the order, but in making payment commitments along the way the ordered items may be reserved as they are ordered, and thus the users gain the advantage of reserving stock but still may only need to receive a single invoice when the order closes, where the final invoice may represent subsequent payment(s)/refund(s) if costs for the order changed while the order was open.

In an example embodiment, a user may be an interior designer working with owners of a house, such as where the interior designer and owners all have shared access to the order. There may be order preferences with respect to cost control with respect to a budget on the interior design project, such as set and agreed upon prior to initiating the order, adjusted by the owners during the process of building the order, and the like. Purchase commitments made during the process (e.g., an initial order payment) may reserve certain items that may have long lead times, limited stock, and the like. A total view of the order by all members of the project may better enable all parties to understand the status of the project, components making up the current state of the interior design, costs associated with different items relative to the overall budget, and the like, prior to closing the order (e.g., a subsequent payment or refund event(s) if costs associated with the order have changed while the order was open) and committing to the next steps in the process.

Figure 5:
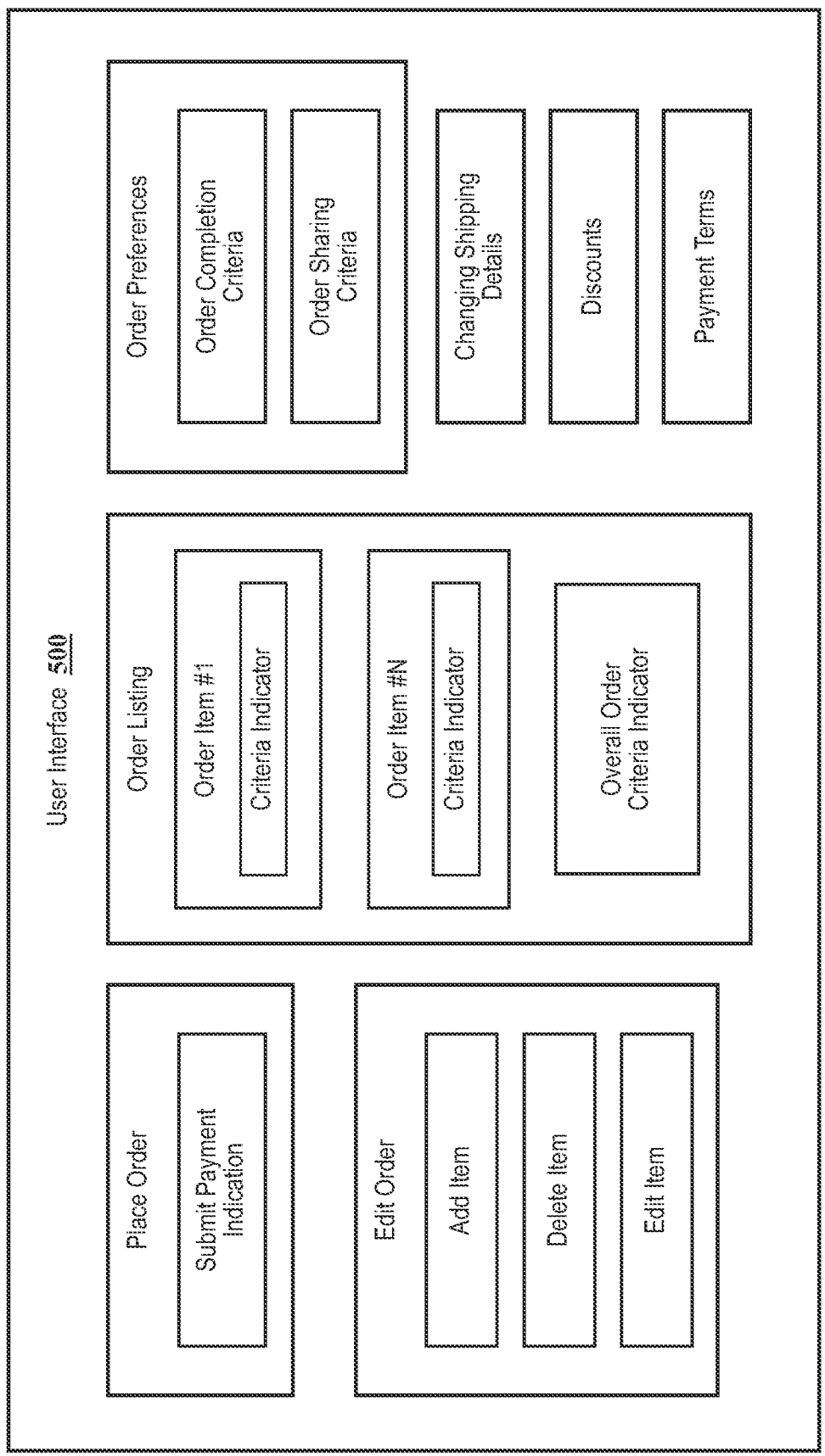
FIG. 5 depicts an embodiment for a user interface for order management.

Referring to FIG. 5, in embodiments a user interface 500 may be provided by the order processor 302, such as to provide a user with the ability to place an order through the order processor 302 in conjunction with submitting an indication of order completion (e.g., payment submission or authorization), where the user is able to continue editing the order (e.g., adding items, deleting items, editing items, and the like) after completing the order, as well as other details associated with the order, such as changing shipping details, updating orders with respect to discounts, adjusting payment terms, and the like. The user interface 500 may display an order listing that updates as the user (or users) edit the order, such as to show the current state of the order. Further, the user interface 500 may provide an interface through which a user is able to enter order preferences, such as order criteria, order sharing criteria, and the like as described herein, as well as display criteria indicators such as for individual order items, groups of order items, for the overall order, and the like. For instance, an order completion criteria may restrict the cost of individual order items where the criteria indicator displays the cost of the order item along with the order completion criteria limit (e.g., product cost $150/cost limit $200), an order completion criteria may restrict the cost of the total order and display the cost of the total order along with the order completion criteria limit (e.g., current order cost $500/order limit $1000), an order sharing criteria may restrict an individual user to items from a certain merchant or group of merchants along with the order sharing criteria limit and display that user's merchant restrictions along with the merchant associated with the order item (e.g., user A is allowed to purchase from 'X' or 'Y' vendors/purchase is from 'X' vendor), and the like. Providing the user interface 500 to the user may enable the user to manage the order more effectively, such as through providing a view of the current state of the order along with indications of how the order preferences are being used. For instance, after observing the effectiveness of a current set of order preferences, a user (e.g., lead purchaser, administrator, manager, and the like) may alter the order preferences to increase order management effectiveness. For example, changing a preferred time from initial order and payment to when an order actually ships based on observing the dates and times a user typically makes changes to the order (e.g., decreasing the preferred time from 7 days to 3 days because the user is making all order changes within the first two days of the initial order).

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A computer-implemented method, the method comprising:
    receiving, at an e-commerce platform, an open order in conjunction with an order completion event and stored in a shared data structure;
    receiving, at the e-commerce platform, an order change to the open order stored in the shared data structure;
    processing the order change to the open order, stored in the shared data structure, to identify a set of permitted changes to the open order according to constraints for permitted changes to the open order, wherein the constraints determine particular types of products cannot be removed from the order;
    applying the set of permitted changes to the open order stored in the shared data structure; and
    responsive to processing an order completion, changing the open order stored in the shared data structure to a closed order.

2. The method of claim 1, further comprising, responsive to the open order stored in the shared data structure being changed to the closed order, processing the order completion event.

3. The method of claim 1, wherein the order completion event includes at least one of a payment submission, a payment authorization or a payment offer.

4. The method of claim 3, further comprising, responsive to the open order stored in the shared data structure being changed to the closed order, processing at least one of the payment submission, payment authorization or payment offer.

5. The method of claim 1, wherein the order completion event includes a payment commitment, and further comprising, responsive to the open order stored in the shared data structure being changed to the closed order, processing the payment commitment.

6. The method of claim 1, wherein the open order stored in the shared data structure is maintained open at least until an order completion criterion is met, and wherein processing the order completion is based on the order completion criterion.

7. The method of claim 1, further comprising receiving order preferences indicating the constraints for permitted changes to the open order stored in the shared data structure.

8. The method of claim 1, wherein the constraints for permitted changes to the open order stored in the shared data structure are stored as an order preference.

9. The method of claim 1, wherein the order is shipped responsive to the open order stored in the shared data structure being changed to the closed order.

10. The method of claim 1, wherein processing the order completion includes an order fulfilment process.

11. A system comprising:
    a processor; and
    a memory storing computer-executable instructions that, when executed by the processor, cause the processor to:
        receive, at an e-commerce platform, an open order in conjunction with an order completion event and stored in a shared data structure;
        receive, at the e-commerce platform, an order change to the open order stored in the shared data structure;
        process the order change to the open order, stored in the shared data structure, to identify a set of permitted changes to the open order according to constraints for permitted changes to the open order, wherein the constraints determine particular types of products cannot be removed from the order;
        apply the set of permitted changes to the open order stored in the shared data structure; and
        responsive to processing an order completion, change the open order to a closed order stored in the shared data structure to a closed order.

12. The system of claim 11, wherein the instructions, when executed by the processor, further cause the processor to, responsive to the open order stored in the shared data structure being changed to the closed order, process the order completion event.

13. The system of claim 11, wherein the order completion event includes at least one of a payment submission, a payment authorization or a payment offer.

14. The system of claim 13, wherein the instructions, when executed by the processor, further cause the processor to, responsive to the open order stored in the shared data structure being changed to the closed order, processing at least one of the payment submission, payment authorization or payment offer.

15. The system of claim 11, wherein the order completion event includes a payment commitment, and further comprising, responsive to the open order stored in the shared data structure being changed to the closed order, processing the payment commitment.

16. The system of claim 11, wherein the open order stored in the shared data structure is maintained open at least until an order completion criterion is met, and wherein processing the order completion is based on the order completion criterion.

17. The system of claim 11, wherein the instructions, when executed by the processor, further cause the processor to receive order preferences indicating the constraints for permitted changes to the open order stored in the shared data structure.

18. The system of claim 11, wherein the constraints for permitted changes to the open order stored in the shared data structure are stored as an order preference.

19. The system of claim 11, wherein the order is shipped responsive to the open order stored in the shared data structure being changed to the closed order.

20. A non-transitory computer-readable medium storing processor-executable instructions that, when executed by one or more processors, are to cause the one or more processors to:
    receive, at an e-commerce platform, an open order in conjunction with an order completion event and stored in a shared data structure;

receive, at the e-commerce platform, an order change to the open order stored in the shared data structure;

process the order change to the open order, stored in the shared data structure, to identify a set of permitted changes to the open order according to constraints for permitted changes to the open order stored in the shared data structure, wherein the constraints determine particular types of products cannot be removed from the order;

apply the set of permitted changes to the open order stored in the shared data structure; and responsive to processing an order completion, change the open order stored in the shared data structure to a closed order.

* * * * *